(12) United States Patent
McGee et al.

(10) Patent No.: US 7,319,977 B2
(45) Date of Patent: Jan. 15, 2008

(54) DISCOUNT-INSTRUMENT METHODS AND SYSTEMS

(75) Inventors: Christopher R. McGee, Aurora, CO (US); Tanya Schwaner, Castle Rock, CO (US); David Baumgartner, Parker, CO (US)

(73) Assignee: First Data Corporation, Englewood, CO (US)

( * ) Notice: Subject to any disclaimer, the term of this patent is extended or adjusted under 35 U.S.C. 154(b) by 848 days.

(21) Appl. No.: 10/268,040

(22) Filed: Oct. 8, 2002

(65) Prior Publication Data

US 2004/0068437 A1  Apr. 8, 2004

(51) Int. Cl.
*G06Q 30/00* (2006.01)

(52) U.S. Cl. ...................................... 705/14
(58) Field of Classification Search .................. 705/14
See application file for complete search history.

(56) References Cited

U.S. PATENT DOCUMENTS

| | | | |
|---|---|---|---|
| 4,528,643 A | 7/1985 | Freeny, Jr. | |
| 4,700,055 A | 10/1987 | Kashkashian, Jr. | |
| 4,884,212 A | 11/1989 | Stutsman | |
| 5,146,067 A | 9/1992 | Sloan et al. | |
| 5,220,501 A | 6/1993 | Lawlor et al. | |
| 5,255,182 A | 10/1993 | Adams | |
| 5,352,876 A | 10/1994 | Watanabe et al. | |
| RE34,915 E * | 4/1995 | Nichtberger et al. | 705/14 |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,557,516 A | 9/1996 | Hogan | |
| 5,592,400 A | 1/1997 | Sasou et al. | |
| 5,637,845 A | 6/1997 | Kolls | |
| 5,678,010 A | 10/1997 | Pittenger et al. | |
| 5,721,768 A | 2/1998 | Stimson et al. | |
| 5,796,832 A | 8/1998 | Kawan | |
| 5,865,470 A * | 2/1999 | Thompson | 283/70 |
| 5,868,236 A | 2/1999 | Rademacher | |
| 5,903,633 A | 5/1999 | Lorsch | |
| 5,936,221 A | 8/1999 | Corder et al. | |
| 5,984,181 A | 11/1999 | Kreft | |
| 5,987,438 A | 11/1999 | Nakano et al. | |
| 5,991,748 A | 11/1999 | Taskett | |
| 6,006,988 A | 12/1999 | Behrmann et al. | |
| 6,129,275 A | 10/2000 | Urquhart et al. | |
| 6,169,975 B1 | 1/2001 | White et al. | |
| 6,193,155 B1 | 2/2001 | Walker et al. | |
| 6,295,522 B1 | 9/2001 | Boesch | |

(Continued)

OTHER PUBLICATIONS

Kutz, Jim, "Re: Grocery Store Cards," Dec. 2, 1997, comp.society.privacy USENET newsgroup posting.*

*Primary Examiner*—Jeffrey D. Carlson
(74) *Attorney, Agent, or Firm*—Townsend and Townsend and Crew LLP

(57) ABSTRACT

Methods and systems are provided to apply a discount to a transaction. An identifier is extracted from a discount instrument and is transmitted to a host system. A validation is received from the host system for the discount instrument and a cost of the transaction is reduced in accordance with a discount arrangement associated with the discount instrument.

45 Claims, 4 Drawing Sheets

U.S. PATENT DOCUMENTS

| | | |
|---|---|---|
| 6,298,336 B1 | 10/2001 | Davis et al. |
| 6,336,099 B1 * | 1/2002 | Barnett et al. ............... 705/14 |
| 6,405,182 B1 | 6/2002 | Cuervo |
| 6,473,500 B1 | 10/2002 | Risafi et al. |
| 6,510,983 B2 | 1/2003 | Horowitz et al. |
| 2001/0018660 A1 | 8/2001 | Sehr |
| 2001/0023409 A1 | 9/2001 | Keil |
| 2001/0023415 A1 | 9/2001 | Keil |
| 2001/0047342 A1 | 11/2001 | Cuervo |
| 2002/0174016 A1 | 11/2002 | Cuervo |
| 2003/0053609 A1 | 3/2003 | Risafi |

* cited by examiner

DISCOUNT-INSTRUMENT METHODS AND SYSTEMS

BACKGROUND OF THE INVENTION

This application relates generally to discount instruments. More specifically, this application relates to methods and systems for providing discount instruments that may be used in fundraising applications.

There are many organizations that rely on fundraising drives or events to finance their operations. Common examples are seen in school groups, such as athletic and other types of clubs, that use fundraising techniques to finance the purchase of uniforms, equipment, and travel, among other expenses. These school groups may engage in fundraising activities regardless of their level, including elementary-school, secondary-school, and university-level groups. Moreover, fundraising activities are often used by other types of groups to finance their activities, including, for example, scouting and social organizations. While many such groups are children's groups, there are also adult groups that rely on similar fundraising activities for financial support.

A persistent problem faced by fundraising organizations is the need to find a fundraising program that is sufficiently appealing to raise the desired funds. In some instances, organizations may rely on donations of a purely charitable nature, although it is often believed that the fundraising is more successful when the donor acquires something of value in exchange. Accordingly, many fundraising drives typically take the form of having individuals in the organization sell a product to customers, with the organization taking some of the profit from the sale. There are a wide variety of products that may be sold, common examples of which include magazine subscriptions, cookies, and candy. While these approaches do have some success, they usually rely on a partnership between the fundraising organization and the regular producer of the product. To accommodate the funds retained by the fundraising organization, the cost of the products may be greater to the consumer than if they were purchased elsewhere and/or the profit provided to the regular producer may be lower than is usual for a comparable purchase. Both of these factors act to limit the overall success of the fundraising activity.

There is accordingly a need in the art for methods and systems that limit the negative impact of these factors.

BRIEF SUMMARY OF THE INVENTION

Embodiments of the invention thus provide for discount-instrument methods and systems. In some instances, the discount instruments used by such methods and systems may result from a fundraising activity, but this is not a requirement. The result of such a fundraising activity is to provide customers with a discount instrument that may be used with merchants to obtain discounts on goods and/or services. In other instances, customers may acquire such a discount instrument through other means. In embodiments of the invention, the customer presents the discount instrument to the merchant to obtain the discount. The merchant ascertains whether the discount instrument is active and determines an applicable discount to be applied to a transaction.

In a first set of embodiments, a method is provided to apply a discount to a transaction. An identifier is extracted from a discount instrument, such as by reading a magnetic strip on the discount instrument, and is transmitted to a host system from a point of sale. The identifier may, for example, comprise an account number extracted from the discount instrument, which may be a plastic card. The transmission to the host system may, for example, take the form of an authorization. A validation is received from the host system for the discount instrument and the transaction is modified in accordance with a discount arrangement associated with the discount instrument. The transaction modification may be dictated by discounting information included on the discount instrument, such as in the form of a bar code or otherwise. Alternatively, the transaction modification may be dictated by discounting information received from the host system. The transaction modification may take a variety of different forms, examples of which include a uniform reduction in transaction cost by a predetermined percentage or through a full-cost deduction of at least one item comprised by the transaction.

In a second set of embodiments, a method is provided to apply a discount to a transaction. Information relating to a discount arrangement is extracted from a discount instrument at a point of sale. The transaction is modified in accordance with the discount arrangement and information relating to the discount arrangement is updated on the discount instrument. In one such embodiment, the information relating to the discount arrangement is extracted from a chip on the discount instrument. In another embodiment, the information relating to the discount arrangement is updated by writing information onto the chip. The transaction may be modified by applying a uniform cost reduction by a predetermined percentage or through a full-cost deduction of at least one item comprised by the transaction.

The above methods may be implemented with a point-of-sale device having a housing with a display screen, a data-entry device, a memory, a communications device, and a processor coupled with the data-entry device, the memory, and the communications device. Such a point-of-sale device may be configured to perform the methods described above.

In a third set of embodiments, a method is provided for managing a discount arrangement. Information relating to the discount arrangement is maintained. An identifier for a discount instrument presented during a transaction is received from a point of sale, and a determination is made whether the identifier identifies an active discount instrument. If so, information for the discount arrangement is transmitted back to the point of sale to identify the discount instrument as an active discount instrument. The discount arrangement may define a variety of different transaction modifications, examples of which include a uniform reduction in transaction cost by a predetermined percentage or a full-cost deduction of at least one item comprised by the transaction. In some embodiments, the information relating to the discount arrangement may also be updated.

These methods may be embodied in a computer-readable storage medium having a computer-readable program embodied therein for directing operation of a computer system. Such a computer system may include a processor, a storage device, and a communications system. The computer-readable program includes instructions for operating the computer system to manage a discount arrangement in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide discount-instrument methods and systems, including usage validation and tracking capabilities. In some of the discussion that follows, examples of the use of such discount instruments is provided, for illustrative purposes, in the context of fundraising programs. It will be appreciated, however, that the invention is not limited to fundraising applications and applies more generally to discount instruments regardless of how they may be obtained by customers. In some embodiments, the discount instrument may take the form of a plastic card similar in structure to a credit card or debit card. In fundraising applications, this card may be sold by individuals of a fundraising organization to customers, who may then use the card to obtain discounts on purchases of goods and/or services at one or more merchants. The card provides the customers with benefits in accordance with a specific discount arrangement, although this discount arrangement may vary among cards. As used herein, the term "discount arrangement" is intended to be construed broadly as any arrangement that provides for a modification of a transaction that benefits a customer. Examples of discount arrangements include provisions that uniformly reduce the cost of transactions either by a percentage amount or predetermined fixed amount, provide "buy one, get one free" or "buy one, get the second at half price" arrangements, and the like. In addition, the benefit provided at each merchant may differ, with one providing a 5% discount, for example, and another providing a free product (such as a free order of popcorn at a movie theater).

Figure 1A:
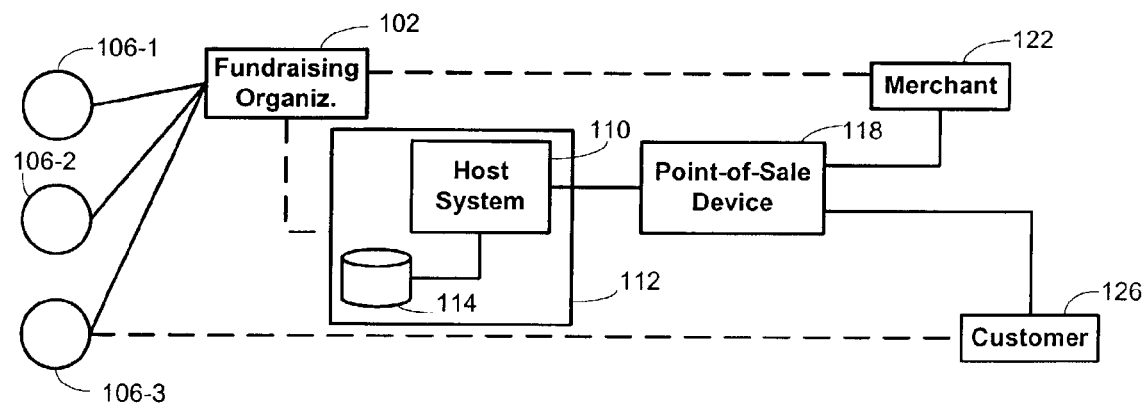
FIG. 1A is a block-diagram representation of an arrangement for implementing a discounting program in accordance with an embodiment of the invention.

One structure that may be used to enable such embodiments is shown schematically with a block diagram in FIG. 1A. In this figure, the general operation of a fundraising system is coordinated with a host system 110. The host system 110 is controlled by a coordination entity 112 that may be responsible for different functions in different embodiments. In a simple embodiment, the host system 110 acts only to coordinate whether the status of individual discount instruments is active or inactive, but in other embodiments it performs further functions, such as tracking and reporting usage information. The host system 110 may additionally maintain information related to the implementation of the system on a database 114 and may use that information to provide discount instructions to a merchant 122 in accordance with the system when a customer 126 presents one of the discount instruments. The host system 110 may also be equipped to modify the implementation information as dictated by a merchant.

Interaction between the host system 110 and the merchant 122 and customer 126 may be effected with a point-of-sale device 118 at a location of the merchant. Generally, the point-of-sale device 118 is equipped to read information from one of the discount instruments and to transmit that information to the host system 110. The host system 110 may then provide a response to the point-of-sale device 118 with a validation or denial of the request. Thus, in an embodiment where the discount instrument comprises a plastic card with a magnetic strip, the point-of-sale device 118 may include a magnetic-strip reader. In other embodiments, the discount instrument may include other features, such as magnetic ink, a bar code, optical indicia, or the like, that the point-of-sale device 118 is equipped to read with magnetic-ink readers, bar-code readers, optical readers, or similar reading devices. In some embodiments, the point-of-sale device 118 may also be equipped to exchange information with a financial institution to coordinate payment by the customer 126 for an associated transaction, such as when the customer pays for the transaction with a credit card, debit card, check, or other instrument. Examples of point-of-sale devices that include multiple capabilities for extracting information from such transaction instruments and/or discount instruments are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

Figure 1C:
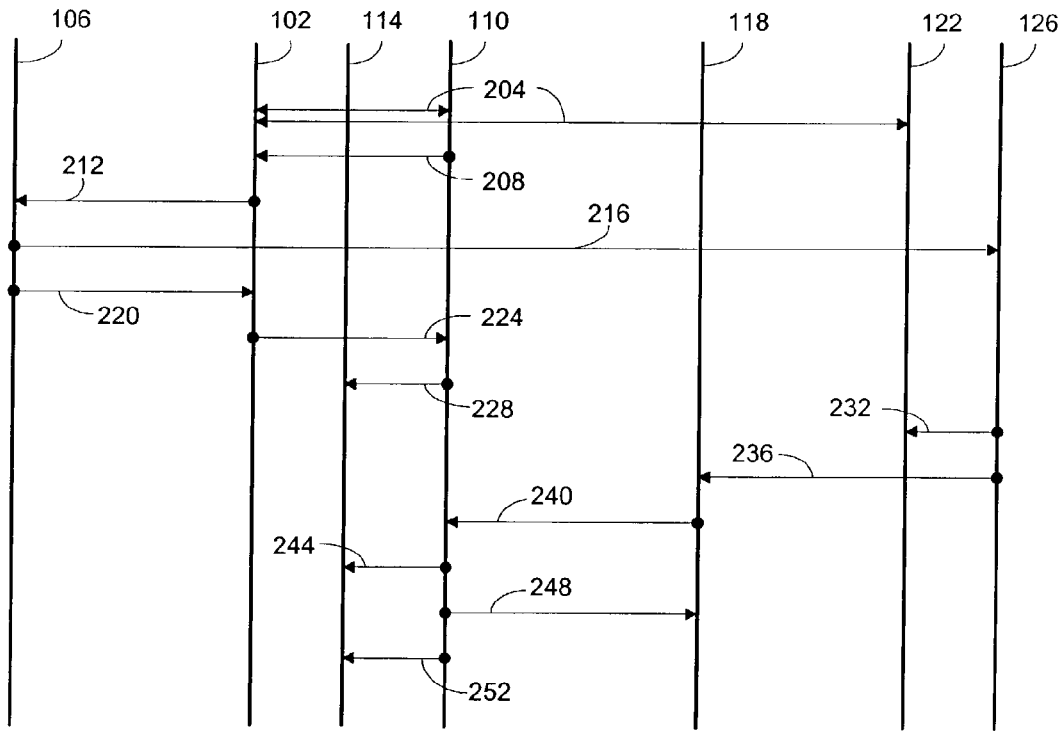
FIG. 1C is a schematic representation of an embodiment of a discounting process using the arrangement shown in FIG. 1A in the context of fundraising activity.
Figure 1B:
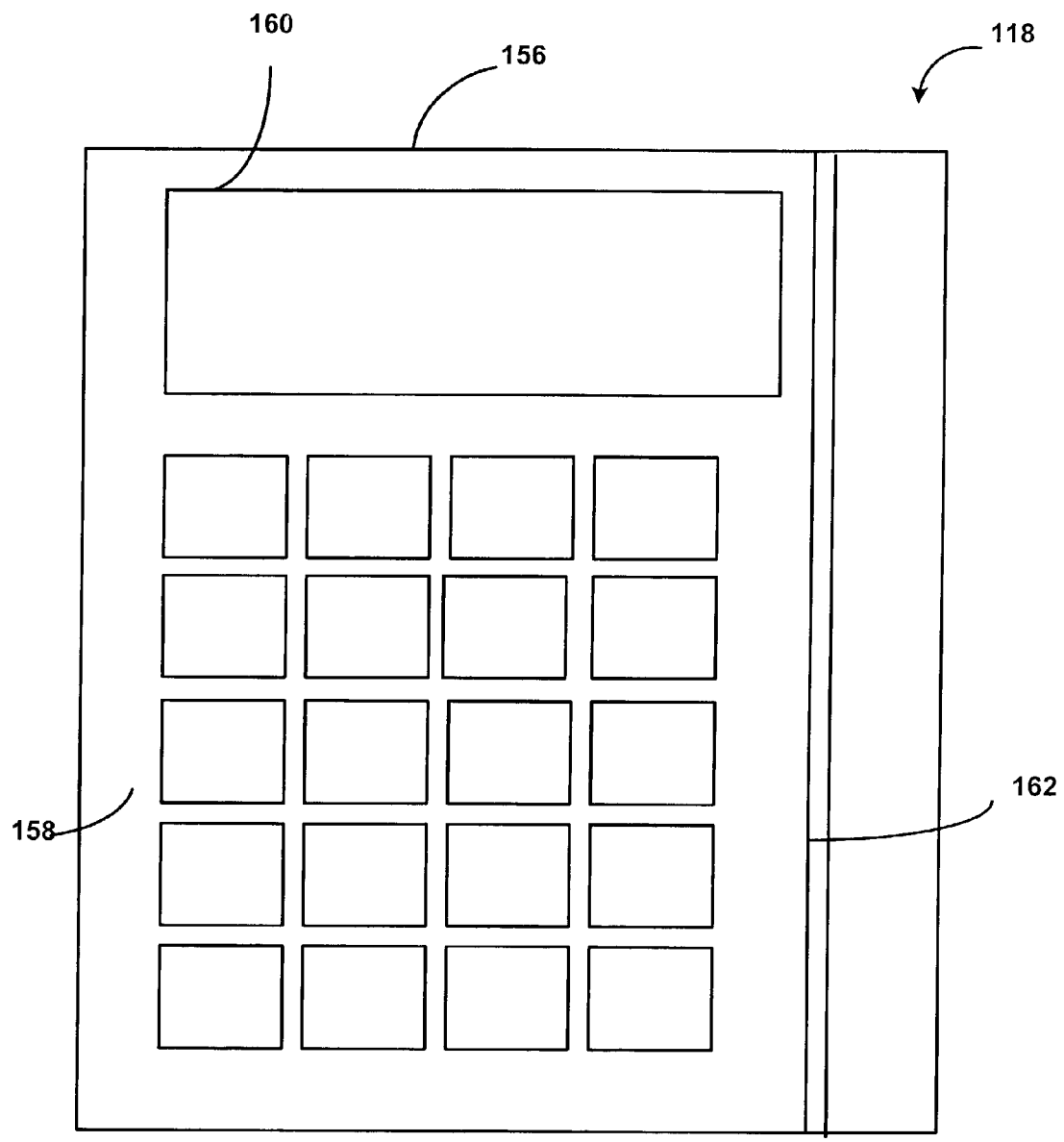
FIG. 1B is a schematic diagram of a point-of-sale device that may be used with embodiments of the invention.

One specific example of how the point-of-sale device 118 may be constructed is illustrated in FIG. 1B. The point-of-sale device 118 comprises a housing 156 having a keypad 158 for entering various types of information. The keys of the keypad 158 may permit the entry of numbers or letters, or may be function keys for performing various functions. The point-of-sale device 118 further includes a display screen 160 for displaying information relating to a transaction and/or to a discount. A card reader 162 may also be provided for reading information from cards. The point-of-sale device 118 may communicate with the host system 110 using any of a wide variety of communications systems, such as by a phone network, a wide-area network such as the Internet, a local-area network, a wireless network, and the like.

In addition to these structural elements of the system, FIG. 1A illustrates how the system may be used in fundraising applications by additionally showing the fundraising organization 102 and individual participant fundraisers 106. The interaction of fundraising organization 102 and the individual fundraisers with the host system 110, merchants 122, and customers 126 is indicated through the use of dotted lines in the diagram.

Figure 2:
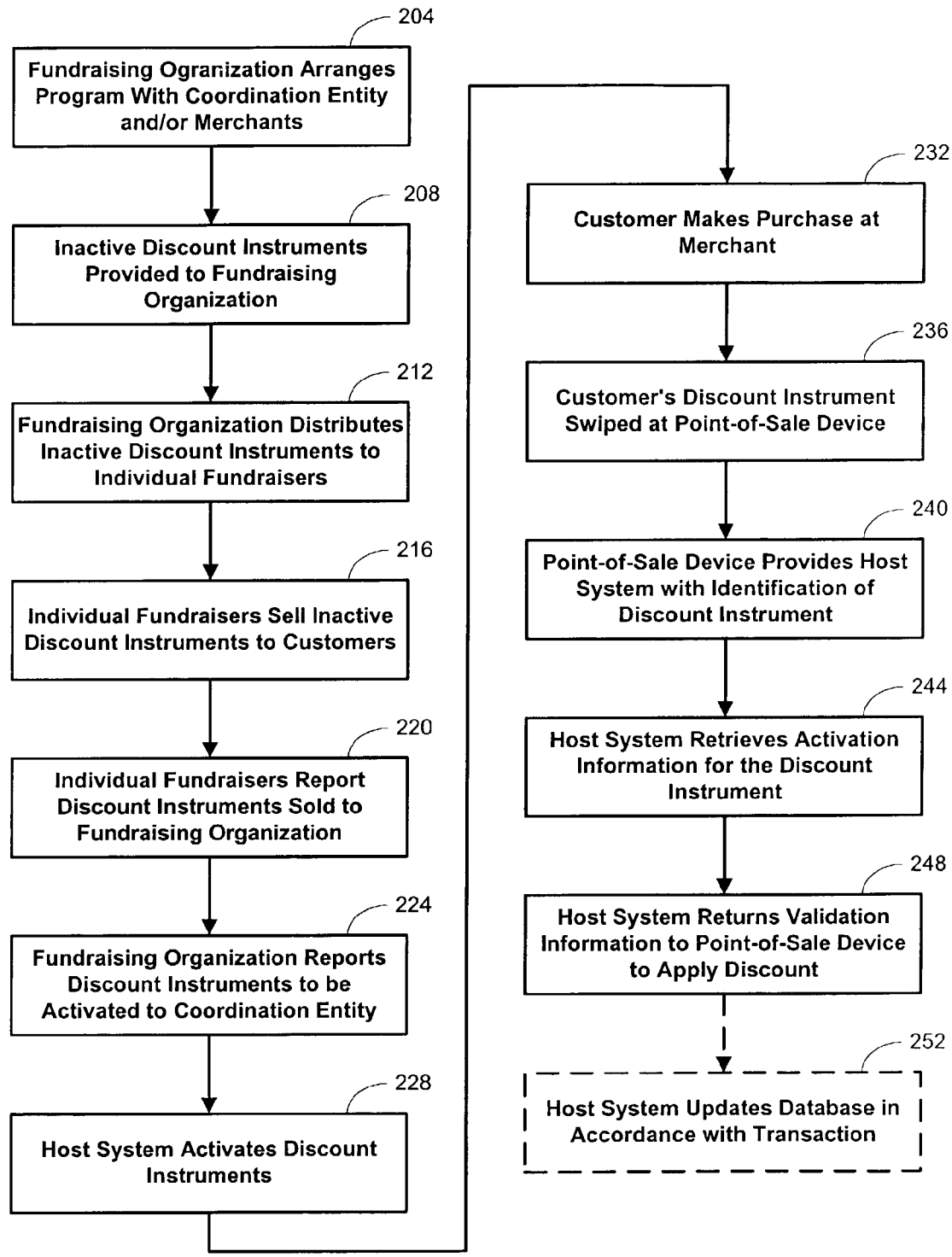
FIG. 2 is a flow diagram of an embodiment of the discounting process that corresponds generally to the representation of FIG. 1B.

FIGS. 1C and 2 depict the implementation of a typical fundraising transaction that uses the arrangement shown in FIG. 1A. FIG. 1C schematically shows the flow of interactions between different components of the structure while FIG. 2 provides a flow diagram that details a specific implementation in an embodiment. The steps shown in FIG. 2 are divided into two columns. The left column shows an example of how customers may acquire discount instruments as part of a fundraising program and the right column shows an example of how a customer with an authenticated discount instrument may use it to obtain discounts. The steps shown in the right column may thus be used to obtain discounts even if the discount instrument is acquired by the customer in a manner other than as part of a fundraising program. The solid-line arrows in FIG. 1C correspond to the blocks in the flow diagram of FIG. 2. The following description of an exemplary transaction thus makes reference to both FIGS. 1C and 2 simultaneously.

As indicated at block 204, the initiation of a fundraising program according to an embodiment of the invention begins with establishing an arrangement between the fundraising organization 102 and the coordination entity 112 and/or one or more merchants 122. Such an arrangement is an example of a discount arrangement that specifies the conditions under which the discount program may operate: which merchants are to participate, what discount benefits those merchants are to provide, what time limits may apply, etc. In some instances, the coordination entity 112 may have one or more preconfigured arrangements from which the fundraising organization 102 selects. After determining what discount arrangement is to be used, further participation by the fundraising organization 102 may be as simple as selling discount instruments to customers for a price in accordance with the discount arrangement. A portion of the price for each discount instrument is retained by the fundraising organization 102 and the remainder is retained by the coordination entity 112.

Thus, at block 208, the coordination entity 112 provides a plurality of discount instruments to the fundraising organization 102 for it to sell. In some embodiments, the discount instruments may comprise cards with magnetic strips, although the use of other forms for the discount instruments is also within the scope of the invention. In some embodiments the discount instruments are inactive when they are provided at block 208, thereby preventing their fraudulent use should any of them be lost or stolen, although in other embodiments they may be active. In one embodiment, the discount instruments are ensured to be inactivate by assigning a unique identifier to each discount instrument and designating it as inactive in the database 114. In some embodiments, the unique identifier may correspond to an account number. The primary activity of the fundraising organization 102 is carried out at block 216 as individual fundraisers 106 sell the discount instruments to customers 126. Such sales may be made in any suitable fashion, including through door-to-door solicitation, mail-order sales, sales at shopping malls, etc.

After the discount instruments have been sold to customers 126, the individual fundraisers 106 notify the fundraising organization 102 at block 220 of which discount instruments have been sold and require activation, if applicable. This information may be accumulated from multiple individual fundraisers 106 so that the fundraising organization conveys a summary of the information to the coordination entity 112 at block 224. This may be done in a variety of different ways. In one embodiment, the host system 110 includes an interface for connection with the Internet, which is then used by the fundraising organization to identify which of the discount instruments should be activated. In other embodiments, a telephone interface may alternatively use dual-tone multiple-frequency ("DTMF") tones to convey the information. In still other embodiments, the information may be conveyed to a representative of the coordination entity 112 who enters it into the host system 110. Regardless of how the information identifying which cards have been sold is provided to the host system 110, the host system 110 activates the respective discount instruments at block 228. Such activation may be achieved by removing the "inactive" designation for each of the discount instruments in the database 114, for example.

After each of the steps shown in the left column of FIG. 2, each customer 126 who has purchased one of the discount instruments may now use it in conjunction with transactions as set forth in the discount arrangement. In one embodiment, for example, the discount arrangement may provide that customers receive a discount on all items purchased from a particular merchant 122. Thus, at block 232 the customer 126 makes a purchase of goods and/or services at one of the participating merchants 122. As part of the transaction, the customer 126 provides the discount instrument so that it may be swiped at the point-of-sale device 118 at block 236. The point-of-sale device 118 reads identification information from the discount instrument, such as by reading an identifier from a magnetic strip. This identification information is conveyed to the host system 110 at block 240 so that the host system 110 may verify the validity of the discount instrument and retrieve activation information at block 244. A validation is returned to the point-of-sale device at block 248 so that the appropriate discount may be applied.

Actual application of the discount may be performed differently in different embodiments, depending on the configuration of the host system 110. For example, in one embodiment, the identification provided by the point-of-sale device 118 to the host system 110 at block 240 may be in the form of an authorization, a specific form of which is a balance-inquiry function, with the validation returned at block 248 indicating only that the discount instrument has been activated. In such an instance, the merchant may collect specific discounting information from the discount instrument itself to apply the discount. The information may be printed on the discount instrument so that the merchant keys the discount into the point-of-sale device 118. Alternatively, the information may be encoded on the discount instrument, such as in the form of a bar code, that may be read with the point-of-sale device 118.

In other embodiments, details of the discount arrangement may be stored in the database 114 connected with the host system 110. In such instances, the validation information returned to the point-of-sale device 118 at block 248 may include not only an indication that the discount instrument has been activated, but also the applicable discount for that instrument. In such an embodiment, the point-of-sale device 118 may then apply the discount automatically without further action on the part of the merchant. For example, if the discount arrangement indicates that the merchant is to offer a 5% discount on all merchandise, the point-of-sale device 118 may apply that discount automatically. If, instead, the discount arrangement indicates that a certain product should be provided free of charge, the point-of-sale device 118 may reduce the total cost of the transaction by the cost of that product.

In instances where such detailed information regarding the discount arrangement is stored at the database 114, it may be appropriate for the information to be updated in response to the transaction. Thus, in such instances, the host system 110 updates the database 114 in accordance with the use of the discount instrument at block 252. For example, if the fundraising arrangement provides for a 5% discount at a particular merchant only three times, the database 114 is updated to record that an additional one of those times has been used; if the customer 126 attempts to use the discount instrument a fourth time, the host system 110 will not instruct the point-of-sale device 118 to apply the discount. Similarly, if the fundraising arrangement provides for a free product only once, the database 114 is updated to record that that portion of the fundraising arrangement has been satisfied and that the product should not be provided free in the future. The updating may also record information about the use of the discount instrument. Such information may be used in evaluating the popularity of different components of fundraising arrangements to improve offerings in the future. Such evaluations may themselves be performed with broad or narrow demographic limitations, providing the coordination entity 112 and/or the merchants 122 with useful marketing information.

There are other techniques that may alternatively be used for activating discount instruments in other embodiments. For example, the activation could be performed the first time the customer uses the discount instrument rather than activating it in advance. It is also possible for the discount instrument to be activated before it is ever sold to a customer. In some instances, the activation is performed as a batch activation of a plurality of cards at one time.

Figure 3:
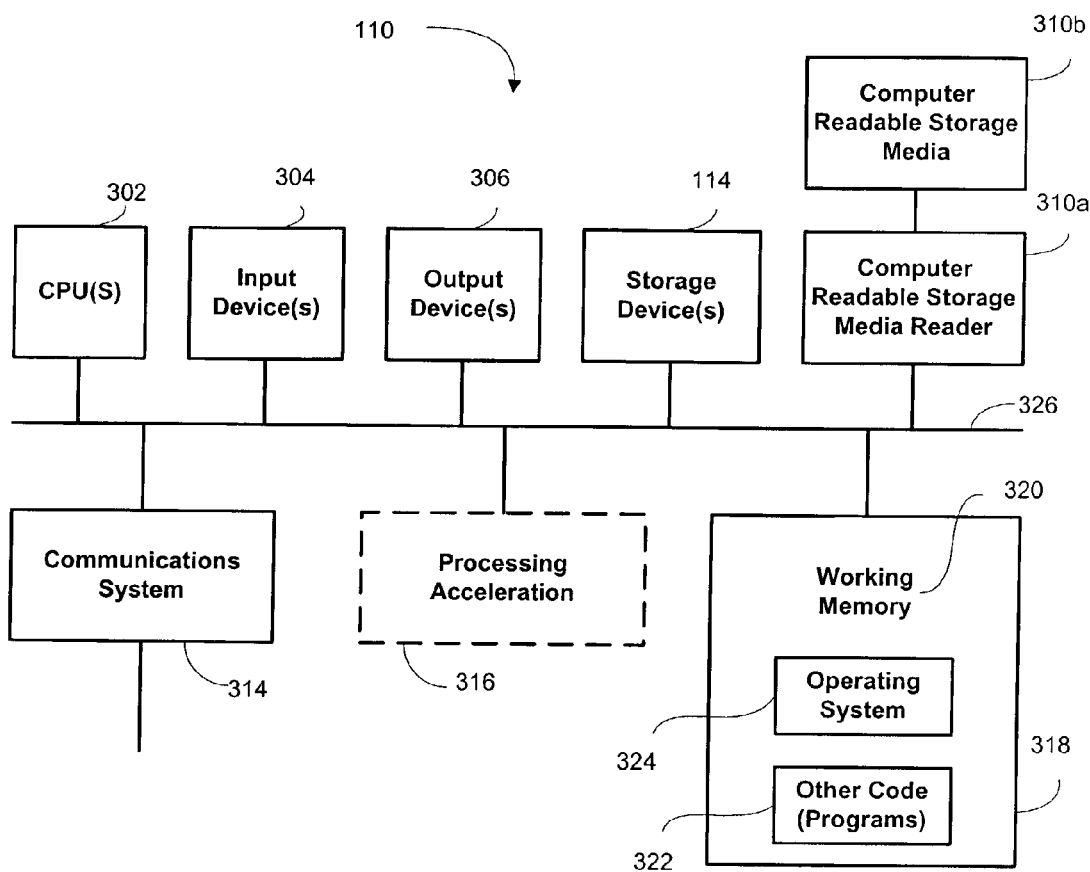
FIG. 3 is a schematic illustration of a computer system on which methods of the invention may be embodied.

FIG. 3 provides a schematic illustration of a structure that may be used to implement the host system 110. Other structures that may be used are, for example, structures provided by IPS Card Solutions d/b/a ValueLink. FIG. 3 broadly illustrates how individual system elements may be implemented in a separated or more integrated manner. The host system is shown comprised of hardware elements that are electrically coupled via bus 326, including a processor 302, an input device 304, an output device 306, the database 114, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged with the Internet, DTMF processor, cable processor, and/or point-of-sale devices 118 as described in connection with FIGS. 1A-2.

The host system 110 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In another set of embodiments, the use of a host system may be avoided. For example, the discount instrument may comprise a chip card (sometimes referred to as a "smart" card) that includes a chip on which information may be stored and retrieved. In such an embodiment, the chip acts as a surrogate for the host system, retaining information regarding the activation of the discount instrument and possibly also specific information regarding the applicable discount arrangement. This information may or may not be subject to updating depending on the nature of the discount arrangement. The chip card may be used in much the same way as described above, with the information being extracted and/or modified with a chip-card reader/writer comprised by the point-of-sale device 118. The operation of the point-of-sale device 118 is similar to that described previously except that it functions in response to information extracted only from the discount instrument rather than also in response to information received from the host system.

Exemplary Discount Arrangements

The systems and methods described above permit the implementation of a number of different types of discount arrangements. The following two examples of a "discount card" arrangement and a "coupon card" arrangement are intended merely as illustrations. Other arrangements will be evident to those of skill in the art after reading this description.

In one embodiment, the discount arrangement provides discount cards, which may, for example, be sold by a fundraising organization 102. The cost of the discount cards charged to customers is $10, of which $5 is retained by the fundraising organization 102 and $5 is retained by the coordination entity 112. The discount cards provide for a 5% discount on merchandise purchased at Merchant A and a 10% discount on merchandise at Merchant B. These merchants have previously agreed to participate in the arrangement with the coordination entity 112 because of the enhanced visibility that their participation provides. In this example, the discount cards are limited in time by a year (or other set time period) to encourage annual repurchases by customers during subsequent fundraising drives. After customers purchase the discount cards from individual fundraisers and the cards are validated, they may use them as described above to receive discounts at Merchants A and B. In an embodiment where only an authorization is performed by the merchant to ensure that the discount card has been activated, the specific discount information may be encoded in two bar codes that are included on the card in addition to the magnetic stripe—one of the bar codes encodes the discount for Merchant A and the other bar code encodes the discount for Merchant B. Alternatively, the actual discounts may be printed on the card for each merchant. In an embodiment where the host system maintains information regarding the discount arrangement, it may return the appropriate discount rate to the point-of-sale device as part of the verification function.

In another embodiment, a discount arrangement provides coupon cards, which may be sold by a fundraising organization 102. The cost of the coupon cards charged to customers is $10, of which $5 is retained by the fundraising organization 102 and $5 is retained by the coordination entity 112. The coupon cards provide for a wide range of one-time discounts off specifically identified products purchased at any merchant. The cards may be advertised to the customers as having, say, a total value of $125 worth of coupons. After customers purchase the coupon cards from individual fundraisers and the cards are validated, they may use them as described above to redeem each of the one-time discounts at any merchant that has a point-of-sale device capable of communication with the host system 110. In one embodiment, the limitation that the cards be used for one-time discounts is enforced by having the host system 110 manage the discount arrangement and update records on the database 114 each time the card is used.

For each of these embodiments, the usage of the cards may be collected as authorizations are provided by the host system 110 for their use. This usage information may include a record of the use of each card at each merchant, with an indication of the date, time, and specific store at which it was used. Software maintained by the host system may perform analytical functions to summarize the information to provide it to the merchants or may provide raw data to merchants for them to perform their own analytical functions. In this way, merchants participating in the program may receive information valuable in the analysis of their business practices.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for applying a discount to a transaction, the method comprising:
    extracting, with a point-of-sale device, an identifier from a discount instrument presented at a point of sale;
    transmitting the identifier from the point-of-sale device to a host system that maintains a specification of one or more discount instruments activated by the host system after sale of the one or more discount instruments as part of a fundraising drive;
    receiving, with the point-of-sale device from the host system, a validation for the presented discount instrument generated by confirming that the presented discount instrument is one of the one or more activated discount instruments; and
    modifying the transaction, with the point-of-sale device, in accordance with a discount arrangement associated with the presented discount instrument.

2. The method recited in claim 1 wherein extracting the identifier from the discount instrument comprises reading a magnetic strip on the discount instrument with the point-of-sale device.

3. The method recited in claim 1 wherein transmitting the identifier to the host system comprises executing an authorization function for the discount instrument.

4. The method recited in claim 3 wherein the authorization function comprises a balance-inquiry function.

5. The method recited in claim 1 further comprising extracting discounting information from the discount instrument with the point-of-sale device.

6. The method recited in claim 5 wherein extracting discounting information from the discount instrument comprises reading a bar code from the discount instrument with the point-of-sale device.

7. The method recited in claim 1 further comprising receiving discounting information with the point-of-sale device from the host system.

8. The method recited in claim 1 wherein modifying the transaction in accordance with the discount arrangement comprises reducing the cost of the transaction by a predetermined percentage.

9. The method recited in claim 1 wherein modifying the transaction in accordance with the discount arrangement comprises deducting a full cost of at least one item comprised by the transaction.

10. The method recited in claim 1 wherein modifying the transaction in accordance with the discount arrangement comprises reducing the cost of the transaction by a predetermined fixed amount.

11. The method recited in claim 1 wherein the discount instrument comprises a plastic card having an encoded magnetic strip.

12. The method recited in claim 1 further comprising generating, with the point-of-sale device, a usage report identifying the transaction.

13. A method for applying a discount to a transaction, the method comprising:
    extracting, with a point-of-sale device, an identifier from a discount instrument presented at a point of sale;
    transmitting the identifier from the point-of-sale device to a host system that maintains a specification of one or more discount instruments activated by the host system after sale of the one or more discount instruments as part of a fundraising drive;
    receiving, with the point-of-sale device from the host system, a validation for the presented discount instrument generated by confirming that the presented discount instrument in one of the one or more activated discount instruments;
    extracting, with the point-of-sale device, information relating to a discount arrangement from the presented discount instrument, wherein the information comprises information defining a rules implementation of the discount arrangement;
    modifying the transaction, with the point-of-sale device, in accordance with the discount arrangement; and
    updating, with the point-of-sale device, the information relating to the discount arrangement on the discount instrument.

14. The method recited in claim 13 wherein extracting information relating to the discount arrangement comprises reading information from a chip on the discount instrument.

15. The method recited in claim 14 wherein updating the information relating to the discount arrangement comprises writing information onto the chip.

16. The method recited in claim 13 wherein modifying the transaction in accordance with the discount arrangement comprises reducing the cost of the transaction by a predetermined percentage.

17. The method recited in claim 13 wherein modifying the transaction in accordance with the discount arrangement comprises deducting a full cost of at least one item comprised by the transaction.

18. The method recited in claim 13 wherein modifying the transaction in accordance with the discount arrangement comprises reducing a cost of the transaction by a predetermined fixed amount.

19. A method for managing a discount arrangement, the method comprising:
    maintaining, by a host system, information relating to the discount arrangement;
    receiving, by the host system, a specification of one or more inactive discount instruments sold as part of a fundraising drive;
    designating, by the host system, the one or more inactive discount instruments as active discount instruments;
    receiving, by the host system, an identifier for a presented discount instrument presented at a point of sale during a transaction;

determining, with the host system, whether the identifier for the presented discount instrument identifies one of the activated discount instruments; and transmitting, with the host system, information for the discount arrangement to identify the presented discount instrument as an active discount instrument so that the discount arrangement is applied to the transaction.

20. The method recited in claim 19 wherein the discount arrangement defines a reduction in cost of the transaction by a predetermined percentage.

21. The method recited in claim 20 further comprising transmitting the predetermined percentage for application during the transaction.

22. The method recited in claim 19 wherein the discount arrangement defines a reduction of a full cost of at least one item of the transaction.

23. The method recited in claim 19 wherein the discount arrangement defines a reduction in cost of the transaction by a predetermined fixed amount.

24. The method recited in claim 22 further comprising transmitting, with the host system, an identification of the at least one item.

25. The method recited in claim 19 further comprising receiving transaction information related to the transaction.

26. The method recited in claim 19 further comprising updating the information relating to the discount arrangement maintained by the host system.

27. The method recited in claim 19 further comprising generating, with the host system, a usage report identifying the transaction.

28. A point-of-sale device comprising:
a housing having a display screen;
a data-entry device;
a memory;
a communications device; and
a processor coupled with the data-entry device, the memory, and the communications device,
wherein the point-of-sale device is configured to extract an identifier from a discount instrument presented at a point of sale, to transmit the identifier to a host system that maintains a specification of one or more discount instruments activated by the host system after sale of the one or more discount instruments as part of a fundraising drive, to receive from the host system a validation for the presented discount instrument generated by confirming that the presented discount instrument is one of the one or more activated discount instruments, and to modify the transaction in accordance with a discount arrangement associated with the presented discount instrument.

29. The point-of-sale device recited in claim 28 wherein the identifier is extracted from the discount instrument by reading a magnetic strip on the discount instrument with the data-entry device.

30. The point-of-sale device recited in claim 28 wherein the identifier is transmitted to the host system as part of an authorization function for the discount instrument.

31. The point-of-sale device recited in claim 28 wherein the point-of-sale device is further configured to extract discounting information from the discount instrument.

32. The point-of-sale device recited in claim 31 wherein the data-entry device comprises a bar-code reader and the discounting information is extracted from the discount instrument by reading a bar code from the discount instrument with the bar-code reader.

33. The point-of-sale device recited in claim 28 wherein the transaction is modified by reducing a cost of the transaction by a predetermined percentage.

34. The point-of-sale device recited in claim 28 wherein the transaction is modified by deducting a full cost of at least one item comprised by the transaction.

35. The point-of-sale device recited in claim 28 wherein the transaction is modified by reducing a cost of the transaction by a predetermined fixed amount.

36. The point-of-sale device recited in claim 28 wherein the data-entry device comprises a magnetic-strip reader.

37. The point-of-sale device recited in claim 28 wherein the data-entry device comprises a chip-card reader.

38. A computer system comprising:
a storage device;
a communications device;
a processor in communication with the storage device and the communications device; and
a memory coupled with the processor, the memory comprising a computer-readable storage medium having a computer-readable program embodied therein for operating the computer system to manage a discount arrangement, the computer readable program including:
instructions for maintaining information relating to the discount arrangement on the storage device;
instructions for receiving a specification of one or more inactive discount instruments sold as part of a fundraising drive with the communications device;
instructions for designating the one or more inactive discount instruments as active discount instruments with the processor;
instructions for receiving an identifier for a presented discount instrument presented at a point of sale during a transaction with the communications device;
instructions for determining whether the identifier for the presented discount instrument identifies one of the activated discount instruments; and
instructions for transmitting information for the discount arrangement to identify the presented discount instrument as an active discount instrument with the communications device so that the discount arrangement is applied to the transaction.

39. The computer system recited in claim 38 wherein the discount arrangement defines a reduction in cost of the transaction by a predetermined percentage.

40. The computer system recited in claim 39 wherein the computer-readable program further includes instructions for transmitting the predetermined percentage with the communications device for application during the transaction.

41. The computer system recited in claim 38 wherein the discount arrangement defines a reduction of a full cost of at least one item of the transaction.

42. The computer system recited in claim 41 wherein the computer-readable program further includes instructions for transmitting an identification of the at least one item with the communications device.

43. The computer system recited in claim 38 wherein the computer-readable program further includes instructions for updating the information relating to the discount arrangement on the storage device.

44. The computer system recited in claim 38 wherein the computer-readable program further includes instructions for generating a usage report identifying the transaction.

45. The method recited in claim 13 further comprising writing, with the point-of-sale device, an indicator that the presented discount instrument is an active discount instrument.

* * * * *